Feb. 12, 1924.
E. OPDERBECK
1,483,241
METHOD AND APPARATUS FOR GRANULATING LIQUID SLAG
Filed Nov. 24, 1922
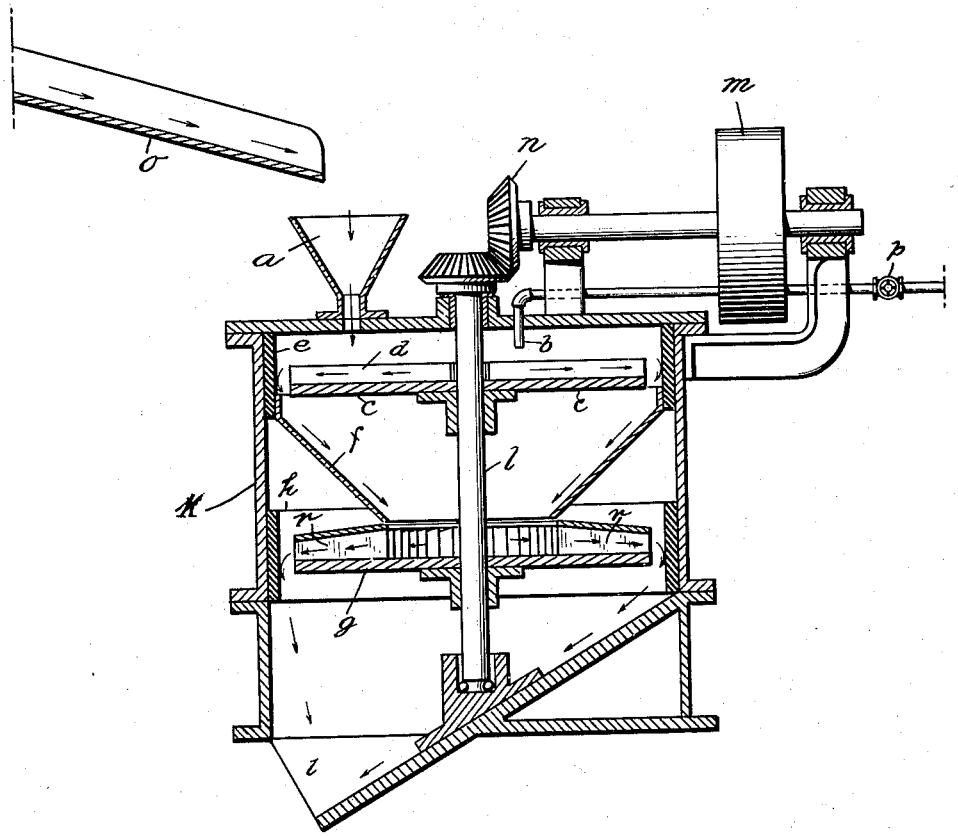
INVENTOR
Emil Opderbeck
BY
Knight Bro
ATTORNEYS Patented Feb. 12, 1924.

1,483,241

UNITED STATES PATENT OFFICE.

EMIL OPDERBECK, OF GELSENKIRCHEN, GERMANY.

METHOD AND APPARATUS FOR GRANULATING LIQUID SLAG.

Application filed November 24, 1922. Serial No. 602,997.

*To all whom it may concern:*

Be it known that I, EMIL OPDERBECK, a citizen of Germany, and residing at Gelsenkirchen, Germany, have invented certain new and useful Improvements in Methods and Apparatus for Granulating Liquid Slag, of which the following is a specification, illustrated in the accompanying drawing.

The particular novel features of my invention are more fully pointed out in the annexed claims.

My invention relates to a method and apparatus for granulating liquid slag such as is obtained from blast furnaces or the like, the granulation being made for the purpose of disintegrating the slag into a comparatively fine sand, which is used for various purposes in the industries.

The present day art is cognizant of two modes of granulation, the wet granulation and the dry granulation. By the former method the slag is poured into a large quantity of cold water in which it is quenched and by which it disintegrates. The last-named method utilizes generally a rotatable cooling drum in which the slag is hardened in the form of granules by the admission of a stream of cold air by the force of which the slag is disintegrated into granules. There are also methods in which for instance the slag is poured upon a pair of rollers by which, due to centrifugal force, it is thrown into a large trough. All of these aforementioned methods have great disadvantages. In case of the wet granulation it is necessary to handle large quantities of water and it becomes necessary to settle the slag sand thus produced in a special settling tank. The slag sand thus produced contains a very large percentage of water which, in case the sand is to be used for the manufacture of cement, must be removed at a great expenditure of heat. The slag sand obtained by the above-mentioned dry granulation method is exceedingly hard and it is very difficult to subsequently grind it. Furthermore, in both the wet and the dry methods the heat contained in the slag is entirely wasted, since it is not utilized for any purpose in the production of the slag sand.

By the method according to my invention these disadvantages are avoided and a slag sand is obtained which, while it has not the disadvantages of extreme hardness obtained by the above-mentioned dry method, yet is perfectly dry when it leaves the apparatus so that it can be utilized in the industries without the necessity of expending additional heat for removing the superfluous water contained therein.

According to my novel method I propose to disintegrate the liquid slag by centrifugal means, through which it is impelled against a surrounding wall or abutment whereby I feed at the same time with the slag onto the centrifugal means a stream of water, in such quantities only that the heat of the slag is able to convert the entire amount of water into steam.

By this method the slag is sufficiently cooled to granulate and at the same time the steam forming during the granulation process of the slag serves for partially loosening up the individual granules in such manner that they not only are broken up into still finer particles when they are impelled against the abutment wall, but that the slag sand thus formed becomes accessible to chemical reaction (by rendering the lime contained in the slag accessible) necessary for instance for the manufacture of slag stones out of such slag sand.

The advantage of this property of the slag sand obtained according to my novel method will be appreciated by the fact that when sand thus obtained is used for the manufacture of slag stones, it becomes unnecessary to add any lime to the slag sand. The sand produced according to my method contains already sufficient lime in chemically active form to permit the sand to be directly compressed into stones. Besides slag stones manufactured with sand produced according to my invention, owing to the fact that the generation of steam also physically loosens up the individual sand particles, become essentially lighter in weight than stones produced from slag sand made according to the methods of the prior art previously referred to.

In the accompanying drawing which represents a longitudinal vertical section, an apparatus is shown by which my novel method is carried out.

In these drawings $k$ represents a cylindrical casing in which a shaft $l$ is centrally vertically journalled as shown. The shaft may be rotated by any suitable means for instance by the pulley $m$ and the gearing $n$. On the top of casing $k$ is provided a funnel $a$ into which the slag is poured from a chute $o$.

Through funnel *a* the slag is supplied onto a disk *c* fixed on shaft *l*, this disk being provided with a suitable number of radial vanes *d*. The diameter of the disk is chosen so that the disk does not extend entirely to the cylindrical wall of casing *k*, for the purpose which will appear presently from the following description. On the cylindrical wall of casing *k* and in alinement with the radial vanes *d* is provided an abutment wall *e* of suitable material. From this wall extends a funnel *f* downwardly which terminates above the central portion of a second disk *g* also mounted on shaft *l* and which is likewise provided with radial vanes *r*. These vanes, however, do not extend as close to the center of the disk as the vanes *d* of disk *c*, so that the central portion of disk *g* remains plain and receives the granulated slag reaching funnel *f*. In lateral alinement with vanes *r* is provided an abutment wall *h* on the inside of casing *k*, disk *g* being of such size that an annular space remains between disk *g* and abutment wall *h*. By means of pipe *b* water is supplied on top of disk *c*, near its center, so that the water will not come into direct contact with the slag, which as is shown, is supplied rather near the periphery of the disk, the amount of water being variable by means of a shut-off valve *p*. The method according to which slag sand is produced by this apparatus is as follows: When the slag reaches disk *c*, which rotates at comparatively high speed it is, by means of centrifugal force, impelled against abutment wall *e*. At the same time, water is supplied onto disk *c*, which latter is sufficiently heated by the slag to generate steam but no more water is supplied than the heat in the slag supplied can convert into steam. In other words, at no time should water come directly into contact with the liquid slag, but only the steam generated, which thus acts upon the slag at a very high temperature which cools the slag, aids its disintegration and at the same time renders it chemically accessible. This would not occur if the slag were chilled by direct contact with water. The granulated slag thus formed drops down on wall *e* between the wall and disk *c* and reaches funnel *f* through which it is supplied to the circular central space of disk *g*. Thence it is expelled between the radial vanes *r* by means of centrifugal force and is impelled against the abutment wall *h*, so that it is further physically disintegrated and converted into a comparatively fine sand. This sand drops down on wall *h* into chute *i* through which it is discharged from the apparatus. By arranging vanes *r* in the manner shown, so that the granulated slag is supplied from above to the central portion of disk *g*, this disk also has an exhaust fan effect for the steam generated within the apparatus as above mentioned and for the air entering through supply funnel *a*. By this ventilator action the effect is obtained that the steam and air, both in the same direction, are discharged together with the slag sand whereby the slag becomes entirely dry and leaves the apparatus in dry condition.

This latter feature constitutes one of the great advantages of my novel method, whereby subsequent drying of the slag sand becomes unnecessary.

Moreover by my novel method the heat which is contained in the slag is not wasted like in the prior art methods mentioned hereinbefore, because according to my method the slag heat is utilized for the generation of steam by which in turn the physical disintegration of the slag is aided and by which also the slag is rendered accessible for chemical reaction as pointed out hereinbefore.

By suitably varying the revolution number of shaft *l*, the degree of the granulation may be regulated.

I claim:—

1. Method for granulating liquid slag, consisting in feeding the liquid slag onto a centrifugally operating expelling element, capable of impelling the slag against an abutment, and in supplying water onto said element in quantities limited by the amount which the heat supplied by the slag is capable of converting into steam, to cause the granulation of the slag into dry slag sand.

2. Method for granulating liquid slag, consisting in feeding the liquid slag onto a centrifugally operating expelling element, capable of impelling the slag against an abutment, and in supplying water onto said element in quantities limited by the amount which the heat supplied by the slag is capable of converting into steam, to cause the granulation of the slag and whereby the steam generated aids in breaking up the slag granules to render them chemically accessible.

3. Method for granulating liquid slag, consisting in feeding the liquid slag onto a centrifugally operating expelling element, capable of impelling the slag against an abutment, and in supplying water onto said element in quantities limited by the amount which the heat supplied by the slag is capable of converting into steam, to cause the granulation of the slag and in supplying the granulated slag and steam to a second centrifugally operating expelling element capable of impelling the slag against a second abutment to cause further disintegration of the slag and to exhaust the steam generated, and the air, contained in the casing and heated by the slag.

4. Method for granulating liquid slag, consisting in feeding the liquid slag onto a centrifugally operating expelling element, capable of impelling the slag against an abutment, and in supplying water onto said element in quantities limited by the amount which the heat supplied by the slag is capable of converting into steam, to cause the granulation of the slag whereby the steam generated aids in breaking up the slag granules and renders them chemically accessible, and in supplying the granulated slag and steam to a second centrifugally expelling element, capable of impelling the slag against a second abutment to cause further the disintegration and chemical accessibility of the slag and to exhaust the steam generated to produce a dry slag sand.

5. Apparatus for granulating liquid slag, comprising a casing, a shaft rotatably disposed therein and having a disk provided with radially disposed vanes, means for supplying the liquid slag onto said disk, means for supplying water to said disk in quantities limited to the amount which the heat supplied by the slag is capable of converting into steam, an abutment wall, surrounding said disk against which the slag is impelled by centrifugal force to be broken up into sand, a second disk on said shaft having radially disposed vanes, means for feeding the steam and the slag sand first formed to the center of said second disk, a second abutment wall surrounding said second disk and against which the sand is impelled for further granulation and means for discharging the sand from the casing, whereby said second disk simultaneously acts as a ventilator for the generated steam and for the air in the casing for the purpose of completely drying the slag sand.

EMIL OPDERBECK.